United States Patent
Kedia et al.

(10) Patent No.: US 11,321,353 B2
(45) Date of Patent: May 3, 2022

(54) DYNAMIC ROLL-OVER OF SOURCE AND TARGET LATENCY IN A REPLICATION ENVIRONMENT

(71) Applicant: INTERNATIONAL BUSINESS MACHINES CORPORATION, Armonk, NY (US)

(72) Inventors: Pravin Kailashnath Kedia, Mumbai (IN); Nirmal Kumar, Bangalore (IN); Elaine Pang, Markham (CA); James Spyker, Toronto (CA)

(73) Assignee: International Business Machines Corporation, Armonk, NY (US)

(*) Notice: Subject to any disclaimer, the term of this patent is extended or adjusted under 35 U.S.C. 154(b) by 403 days.

(21) Appl. No.: 15/926,540

(22) Filed: Mar. 20, 2018

(65) Prior Publication Data

US 2019/0294723 A1     Sep. 26, 2019

(51) Int. Cl.
*G06F 16/27* (2019.01)
*G06F 11/34* (2006.01)
*G06F 16/22* (2019.01)

(52) U.S. Cl.
CPC ........ *G06F 16/273* (2019.01); *G06F 11/3419* (2013.01); *G06F 16/2282* (2019.01)

(58) Field of Classification Search
CPC ........... G06F 17/30578; G06F 11/3419; G06F 17/30339; G06F 16/273; G06F 16/2282
USPC ...................................................... 707/615
See application file for complete search history.

(56) References Cited

U.S. PATENT DOCUMENTS

| | | | |
|---|---|---|---|
| 6,446,089 B1* | 9/2002 | Brodersen | ............. G06F 16/278 |
| 8,301,593 B2* | 10/2012 | Hoffmann | ........... G06F 11/2094 |
| | | | 707/658 |
| 9,442,995 B2 | 9/2016 | Pareek et al. | |
| 9,569,473 B1 | 2/2017 | Holenstein et al. | |
| 9,886,347 B2* | 2/2018 | Hrle | ........................ G06F 16/86 |
| 10,152,499 B1* | 12/2018 | Wilton | .................. G06F 16/219 |
| 2006/0190504 A1* | 8/2006 | Pruet, III | ............ G06F 16/2343 |
| 2012/0101990 A1 | 4/2012 | Holenstein et al. | |
| 2013/0268488 A1* | 10/2013 | Jackiewicz | ........... G06F 9/4868 |
| | | | 707/624 |
| 2015/0278329 A1 | 10/2015 | Hrle et al. | |
| 2016/0171070 A1* | 6/2016 | Hrle | .................... G06F 16/2379 |
| | | | 707/615 |
| 2017/0220424 A1* | 8/2017 | Doshi | ................. G06F 11/2074 |
| 2017/0255529 A1 | 9/2017 | Kedia et al. | |

\* cited by examiner

*Primary Examiner* — Hosain T Alam
*Assistant Examiner* — Robert F May
(74) *Attorney, Agent, or Firm* — Steven M. Bouknight

(57) ABSTRACT

A system and method for performing a dynamic rollover of source and target latency in a replication environment. One or more tables of a source data store being replicated to a target data store are parked, wherein any subsequent changes for the parked tables are not replicated to the target data store. Open transactions are identified where the parked tables affect the source and target latency, wherein the open transactions are in-progress and not completed. The source and target latency are then calculated for the identified open transactions.

12 Claims, 4 Drawing Sheets

DYNAMIC ROLL-OVER OF SOURCE AND TARGET LATENCY IN A REPLICATION ENVIRONMENT

CROSS-REFERENCE TO RELATED APPLICATION

This application is related to the following co-pending and commonly-assigned patent application:

U.S. Utility patent application Ser. No. 15/281,607, filed on Sep. 30, 2016, by Pravin K. Kedia et al., entitled "ACL BASED OPEN TRANSACTIONS IN REPLICATION ENVIRONMENT,";

which application is incorporated by reference herein.

BACKGROUND

The present invention relates generally to the field of data replication, and more particularly, to the reporting of latency values in a data replication environment.

In today's competitive markets, many companies provide data replication tools with their database management systems (DBMS). These data replication tools are used to replicate data from a source data store to one or more target data stores on a close to real-time basis.

However, there is a need for improved methods for measuring the latency involved in the replication, from the perspective of both the source and target data stores.

SUMMARY

The invention provided herein has a number of embodiments useful, for example, in implementing a computer-implemented method, system and computer program product for performing a dynamic rollover of source and target latency in a replication environment, by: parking one or more tables of a source data store being replicated to a target data store; identifying open transactions, which are in-progress and not completed, where the parked tables affect the source and target latency; and calculating the source and target latency for the identified open transactions. Thereafter, the identified open transactions may be skipped or ignored, and any subsequent changes for the parked tables need not be replicated to the target data store.

Identifying the open transactions may comprise identifying the open transactions where only the parked tables are in-scope tables. Identifying the open transactions may also comprise identifying the open transactions where the parked tables are in-scope tables and the identified open transactions were initiated by one or more users with a determined minimum privilege to perform at least one of an insert, update or delete operation against the parked tables.

The source latency shows a difference in time between when at least one of an insert, update or delete operation for the identified open transaction was written to a transaction log and when the operation was read from the transaction log for replication to the target data store.

The target latency shows a difference in time between when at least one of an insert, update or delete operation for the identified open transaction was written to a transaction log and when the operation was applied to the target data store.

DETAILED DESCRIPTION

In the following description, reference is made to the accompanying drawings which form a part hereof, and in which is shown by way of illustration one or more specific embodiments in which the invention may be practiced. It is to be understood that other embodiments may be utilized, and structural and functional changes may be made without departing from the scope of the present invention.

Overview

This invention calculates a more accurate source and target latency for subscriptions of a replication process. Specifically, only open transactions in a transaction log at a source data store that relate to in-scope tables, and not parked tables or otherwise out-of-scope tables, need to be maintained and present for the replication process. Moreover, when a table is parked during the replication process, a dynamic roll-over is performed of source and target latency in order to provide more accurate values.

System Description

Figure 1:
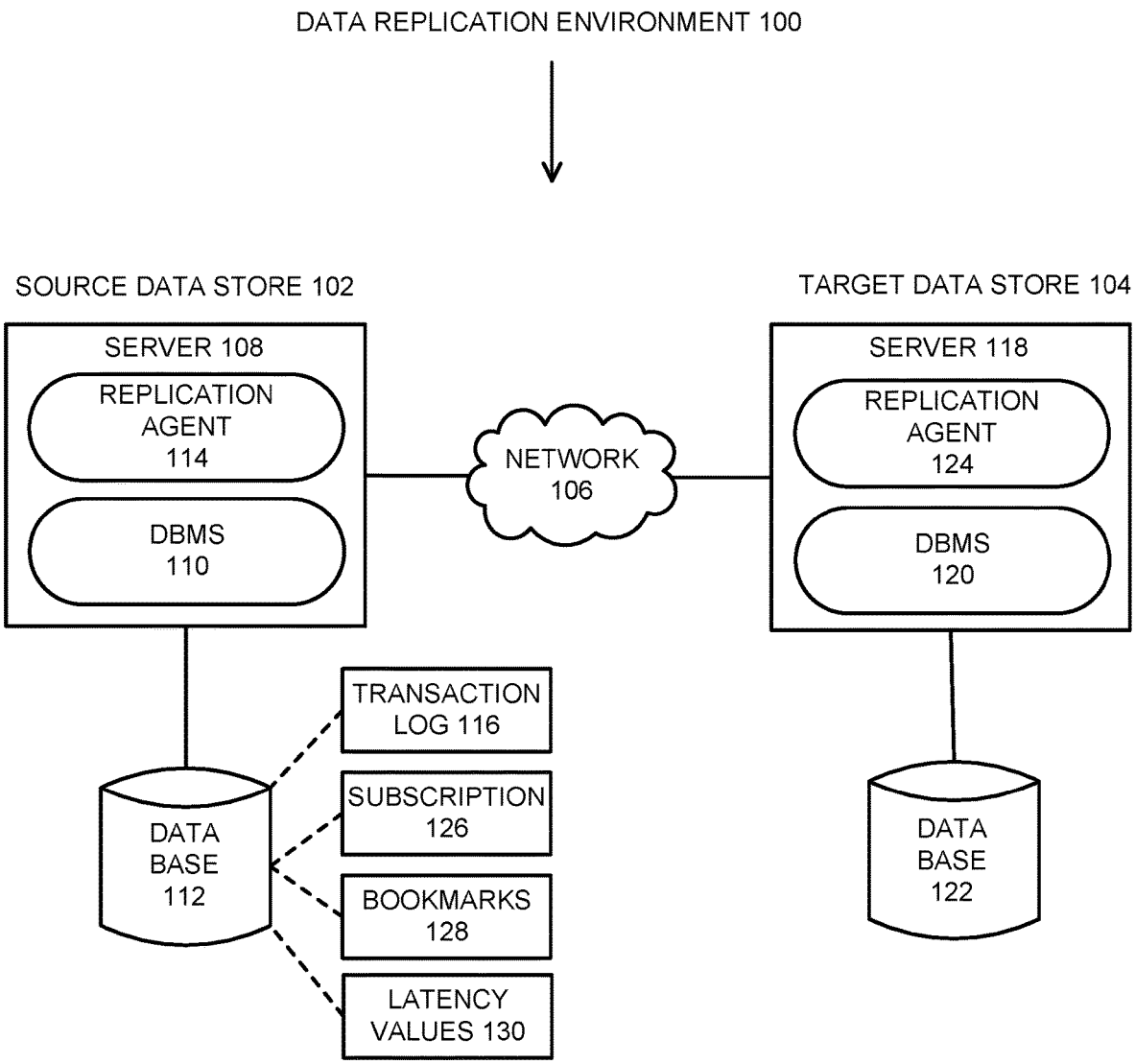
FIG. 1 is a functional block diagram illustrating a data replication environment, in accordance with an embodiment of the present invention.

FIG. 1 is a functional block diagram illustrating a data replication environment 100 according to one embodiment. The data replication environment 100 includes a source data store 102 and a target data store 104, which are interconnected over a network 106. The source data store 102 and/or the target data store 104 may be implemented in a cloud computing environment, as described in more detail below.

The source data store 102 includes at least one server computer 108 that executes a source DBMS 110 to manage a source database 112 and a source replication agent 114 to perform a replication process. The source data store 102 also includes one or more transaction logs 116 for the DBMS 110 and database 112.

Similarly, the target data store 104 includes at least one server computer 118 that executes a target DBMS 120 to manage a target database 122 and a target replication agent 124 to perform the replication process.

The source and target replication agents 114, 124 enable data to be copied from the source data store 102 to the target data store 104. The replication of source data store 102 to the target data store 104 results is a distributed database in which users can access data relevant to their tasks without interfering with the work of others.

A subscription 126 describes a connection that is used to replicate data between the source data store 102 and the target data store 104. The subscription 126 contains details of the data that is being replicated (e.g., a list of tables), and how the data from the source data store 102 is applied to the target data store 104.

Replication Process

Typically, data is replicated using the transaction log 116, which is also referred to as a transaction journal, database log, or audit trail. The transaction log 116 records all transactions performed by the source DBMS 110 and the modifications made to the source database 112 by each transaction. Specifically, the transaction log 116 is a file that lists changes to the source database 112.

The transaction log 116 generally supports individual transaction recovery, recovery of all incomplete transactions when the source DBMS 110 is restarted, and rolling forward a restored copy of the source database 112 to a point of failure, as well as replication of the transactions. During recovery, every transaction recorded in the transaction log 116 that may not have been written to the source database 112 is rolled forward, while every incomplete transaction found in the transaction log 116 is rolled back, to make sure the integrity of the source database 112 is preserved.

In a replication process that comprises database mirroring, every transaction in the source data store 102 that is within the subscription 126 is sent to the target data store 104, wherein the target replication agent 124 applies the incoming transactions to the target DBMS 120 and target database 122. If a transaction is not committed on the source DBMS 110 (and therefore also not committed on the target DBMS 120), then that transaction is called an "open" transaction, i.e., a transaction that is in-progress and not completed.

The transaction log 116 provides the source replication agent 114 with information about open transactions on the source DBMS 110, along with information relating to users who performed the transactions. The source replication agent 114 tracks all of the open transactions, so that there is no need to continuously query the source database 112 catalog.

In one embodiment, the source replication agent 114 maintains one or more bookmarks 128 to the transaction log 116 that identify the open transactions. One of the bookmarks 128 identifies an earliest open transaction, which is determined from the source database 112, and the bookmark 128 for the earliest open transaction only moves forward when the earliest open transaction is committed or rolled back on the source DBMS 110.

However, not all open transactions are relevant or contextual to the replication process. For example, the earliest open transaction may be the earliest at the entire source database 112 level and not necessarily the earliest in the context of the replication process.

In one embodiment, the source replication agent 114 has the ability to dynamically skip or ignore open transactions that are not contextual to the replication process and move to a next open transaction in the transaction log 116. Specifically, one way to improve the handling of the open transactions is by moving the bookmarks 128 for the open transactions when the open transactions only involve tables that are out-of-scope for the replication process.

For example, assume there are N tables in the source database 112, including tables T1, T2, T3 . . . and Tn, but only T1 and T2 are part of the replication process. In this example, T1 and T2 are called in-scope tables, because they are part of the replication process, while the remaining tables are out-of-scope tables, because they are not part of the replication process. Transactions that do not involve tables T1 and T2 would be considered out-of-scope, and would therefore be skipped or ignored for purposes of the replication process. This is an improvement over existing systems that unnecessarily keep track of transactions that are not contextual to the replication process.

Access control list (ACL) based open transaction processing also may be used to skip or ignore open transactions that are not contextual for the replication process. The ACL is a list of privileges or permissions attached to an object, such as a table. The ACL specifies which user is granted access to the object, as well as what operations that user may perform on the object.

In one embodiment, the source replication agent 114 only considers open transactions initiated by a user who has a determined minimum privilege according to the ACL to perform at least one Data Manipulation Language (DML) command or statement that involves an insert, update and/or delete operation against any of the in-scope tables that are part of the replication process. Open transactions need not be considered by the source replication agent 114 where such privileges to the in-scope tables are missing, which means the particular open transactions are not contextual to the replication process.

Under various circumstances, a user may park one or more tables of the subscription 126, which indicates that the parked tables need not be replicated. Specifically, the source replication agent 114 considers the parked tables to be out-of-scope for the replication process, and does not replicate any subsequent changes for the parked tables to the target data store 104.

The source replication agent 114 captures the event of the table being parked, and updates the metadata of the subscription 126 that the tables are parked. This may occur before, during or after the replication process.

When a user parks a table of the subscription 126 during the replication process, the source replication agent 114 identifies all of the open transactions where the parked table affects the source and target latency, which are calculated and stored as source and target latency values 130.

For example, if the parked table is the only in-scope table of a particular open transaction, then that particular open transaction can be skipped or ignored. In another example, if the parked table is an in-scope table of a particular open transaction, and that particular open transaction was initiated by one or more users with a determined minimum privilege to perform at least one of an insert, update or delete operation against the parked table, then that particular open transaction can be skipped or ignored. In both instances, if that particular open transaction is the earliest open transaction, then the source replication agent 114 determines a next earliest open transaction in the transaction log 116 in a forward manner.

If a particular open transaction is skipped or ignored due to the table being parked during replication, then the source replication agent 114 reports the source and target latency values 130 for all of the subscriptions 126 that included the parked table. When a table is parked during replication, a dynamic roll-over of the source and target latency is performed, in order to provide more accurate source and target latency values 130.

The source latency value 130 for the subscription 126 shows the difference in time between when an entry (e.g., an insert, update and/or delete operation) in a record was written to the transaction log 116 and the time when the source replication agent 114 for the source data store 102 read the record from the transaction log 116.

The target latency value 130 shows the difference in time between when the entry (e.g., an insert, update and/or delete operation) in a record was written to the transaction log 116 and the time at which the target replication agent 124 for the target data store 104 applied that operation to the target DBMS 120 and target database 122.

Typically, the source latency value 130 for the subscription 126 is updated by the source replication agent 114 when the source DBMS 110 performs a commit or rollback operation for the open transaction. Similarly, the target latency value 130 for the subscription 126 is updated when the target replication agent 124 for the target data store 104 receives a commit or rollback operation from the source replication agent 114.

However, when a table is parked, the source and target replication agents 114, 124 need to rectify the source and target latency values 130. Specifically, when the table is parked, the dynamic roll-over of the source and target latency results in the source and target replication agents 114, 124 calculating the source and target latency values 130 of the subscription 126.

Consequently, the source latency value 130 for the subscription 126 is updated by the source replication agent 114 when the table is parked. Similarly, the target latency value 130 for the subscription 126 is updated by the target replication agent 124 when it is notified by the source replication agent 114 that the table is parked.

The result is more accurate source and target latency values 130 for subscriptions 126 of a replication process. Specifically, when a table is parked, open transactions are identified where source and target latency are affected, so that the source and target latency can be calculated to provide more accurate source and target latency values 130.

Flowchart

Figure 2:
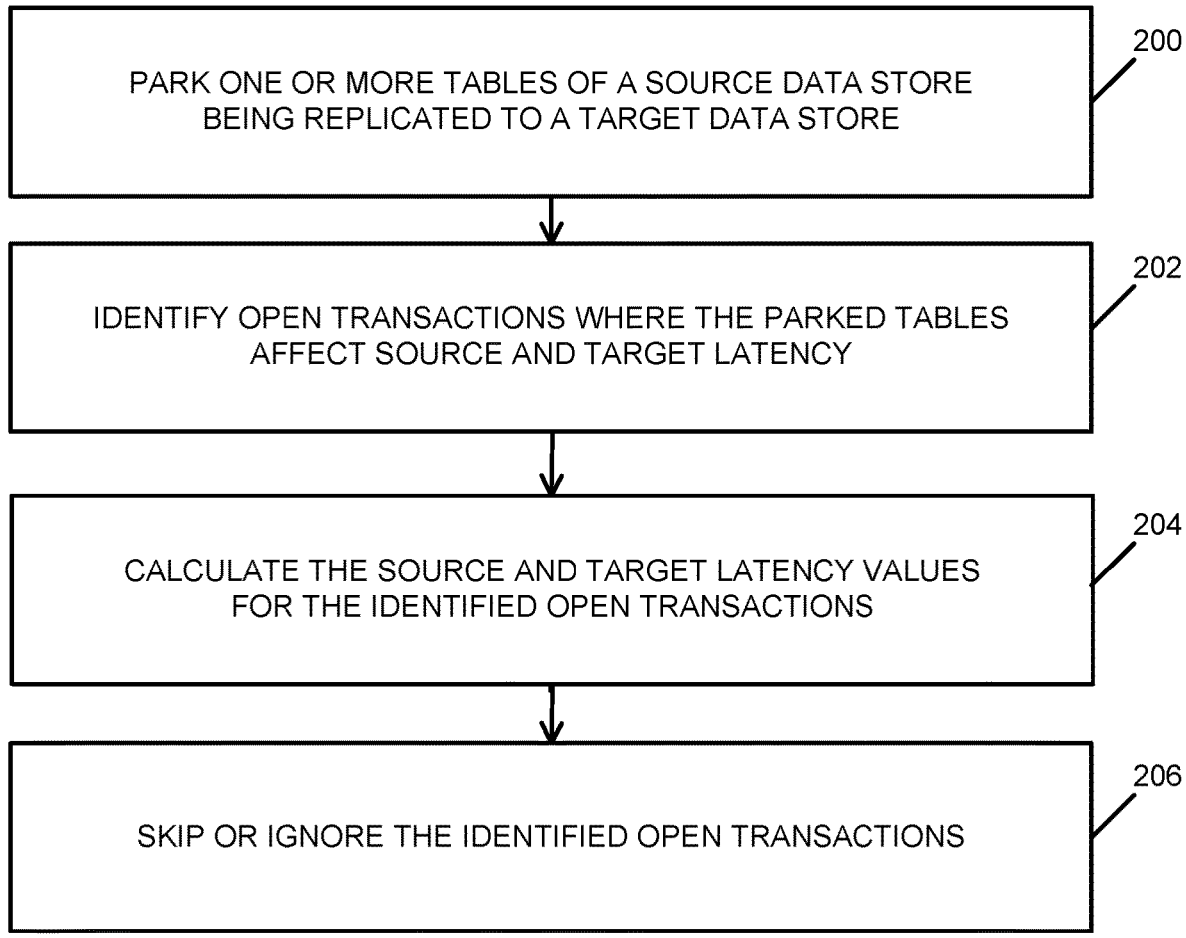
FIG. 2 is a flowchart illustrating the processing steps of the present invention in performing a dynamic rollover of source and target latency in the data replication environment, in accordance with an embodiment of the present invention.

FIG. 2 is a flowchart illustrating the steps and functions of the present invention in performing a dynamic rollover of source and target latency in a replication environment.

Block 200 represents the step or function of parking one or more tables of a source data store 102 being replicated to a target data store 104, wherein any subsequent changes for the parked tables are not replicated to the target data store 104.

Block 202 represents the step or function of identifying open transactions where the parked tables affect the source and target latency, wherein the open transactions are in-progress and not completed. Identifying the open transactions may comprise identifying the open transactions where only the parked tables are in-scope tables. Identifying the open transactions also may comprise identifying the open transactions where the parked tables are in-scope tables and the identified open transactions were initiated by one or more users with a determined minimum privilege to perform at least one of an insert, update or delete operation against the parked tables.

Block 204 represents the step or function of calculating the source and target latency values 130, for the identified open transactions. The source latency value 130 shows a difference in time between when at least one of an insert, update or delete operation for the identified open transaction was written to a transaction log 116 and when the operation was read from the transaction log 116 for replication to the target data store 104. The target latency value 130 shows a difference in time between when at least one of an insert, update or delete operation for the identified open transaction was written to a transaction log 116 and when the operation was applied to the target data store 104.

Block 206 represents the step or function of skipping or ignoring the identified open transactions.

SUMMARY

In summary, it can be seen that the present invention provides a number of benefits and advantages. These benefits and advantages include improvements to the technology or technical field of data replication environments, and more specifically, performing a dynamic rollover of source and target latency in a replication environment. These benefits and advantages also include improvements to the functioning of the computers themselves, as compared to prior computer-implemented methods and systems for replicating data between source and target data stores 102, 104.

With regard to improvements to the technology or technical field, the computer-implemented method and system for performing a dynamic rollover of source and target latency in a replication environment provides more accurate calculations of the source and target latency. Specifically, if parking a table affects the source and target latency of an open transaction, then the source and target latency are calculated when such open transactions are identified.

With regard to improvements to the functioning of the computer itself, the computer-implemented method and system of this invention performs: a step or function that parks one or more tables of a source data store 102 being replicated to a target data store 104; a step or function of identifying open transactions where the parked tables affect the source and target latency; and a step or function of calculating the source and target latency for the identified open transactions.

Both generally and specifically, these steps and functions of the computer-implemented method and system comprise specific improvements other than what is well-understood, routine and conventional in the field. Moreover, these steps and functions of the computer-implemented method and system add unconventional steps to a particular useful application.

The result is improved performance, reduced latency and reduced transaction log 116 retention, relating to the replication process. Users and administrators are able to more accurately judge storage requirements for archiving transaction logs 116, in that only transaction logs for in-scope tables, but not parked tables, need to be included. A parked table can also help reduce the transaction log 116 retention policy, thereby saving on disk space and administrative efforts.

Cloud Computing

It is to be understood that this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 3:
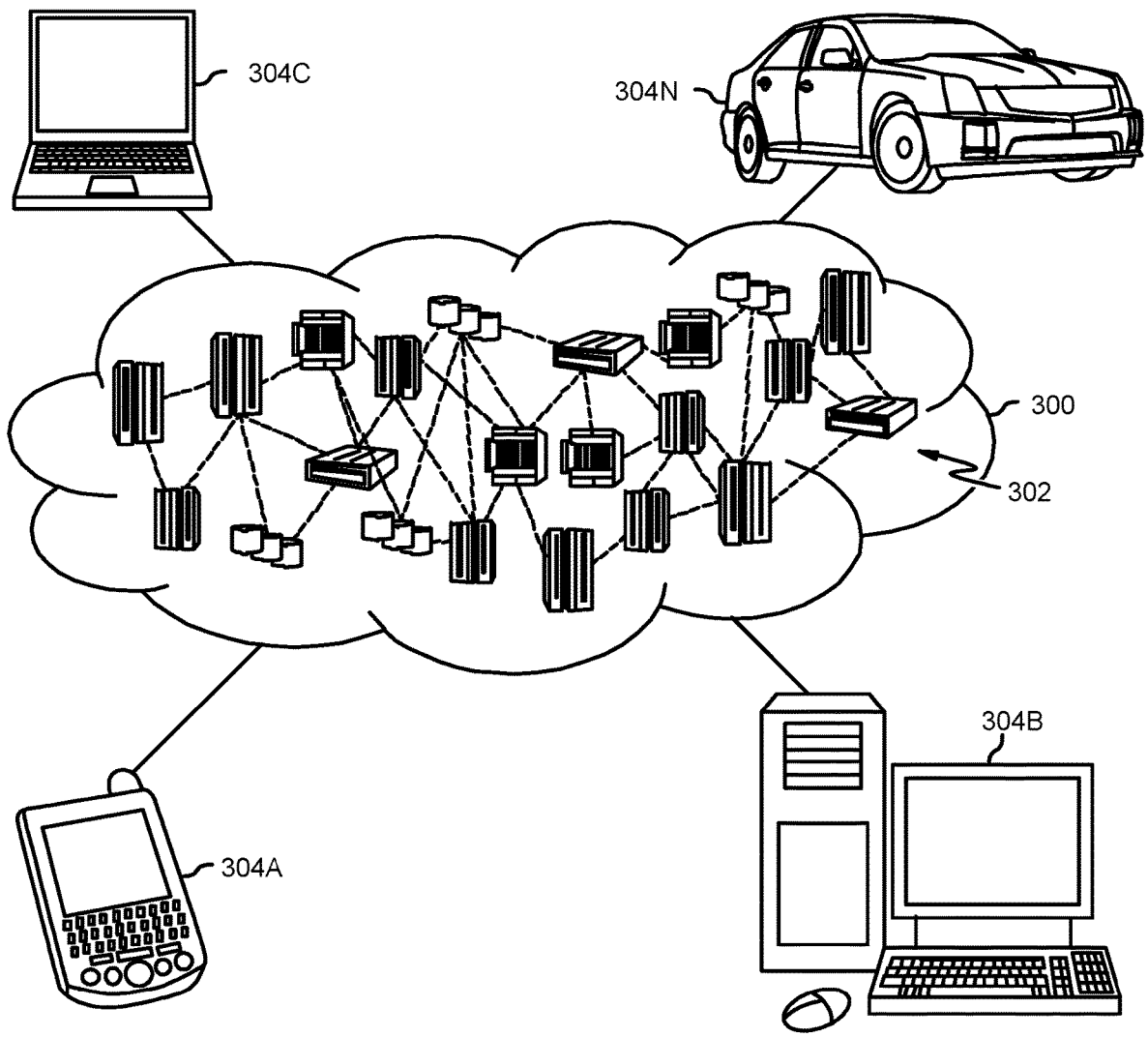
FIG. 3 illustrates a cloud computing environment that may be used to implement the data replication environment, in accordance with an embodiment of the present invention.

Referring now to FIG. 3, illustrative cloud computing environment 300 is depicted. As shown, cloud computing environment 300 includes one or more cloud computing nodes 302 with which local computing devices used by cloud consumers, such as, for example, personal digital assistant (PDA) or cellular telephone 304A, desktop computer 304B, laptop computer 304C, and/or automobile computer system 304N may communicate. Nodes 302 may communicate with one another. They may be grouped (not shown) physically or virtually, in one or more networks, such as Private, Community, Public, or Hybrid clouds as described hereinabove, or a combination thereof. This allows cloud computing environment 300 to offer infrastructure, platforms and/or software as services for which a cloud consumer does not need to maintain resources on a local computing device. It is understood that the types of computing devices 304A-N shown in FIG. 3 are intended to be illustrative only and that computing nodes 302 and cloud computing environment 300 can communicate with any type of computerized device over any type of network and/or network addressable connection (e.g., using a web browser).

Figure 4:
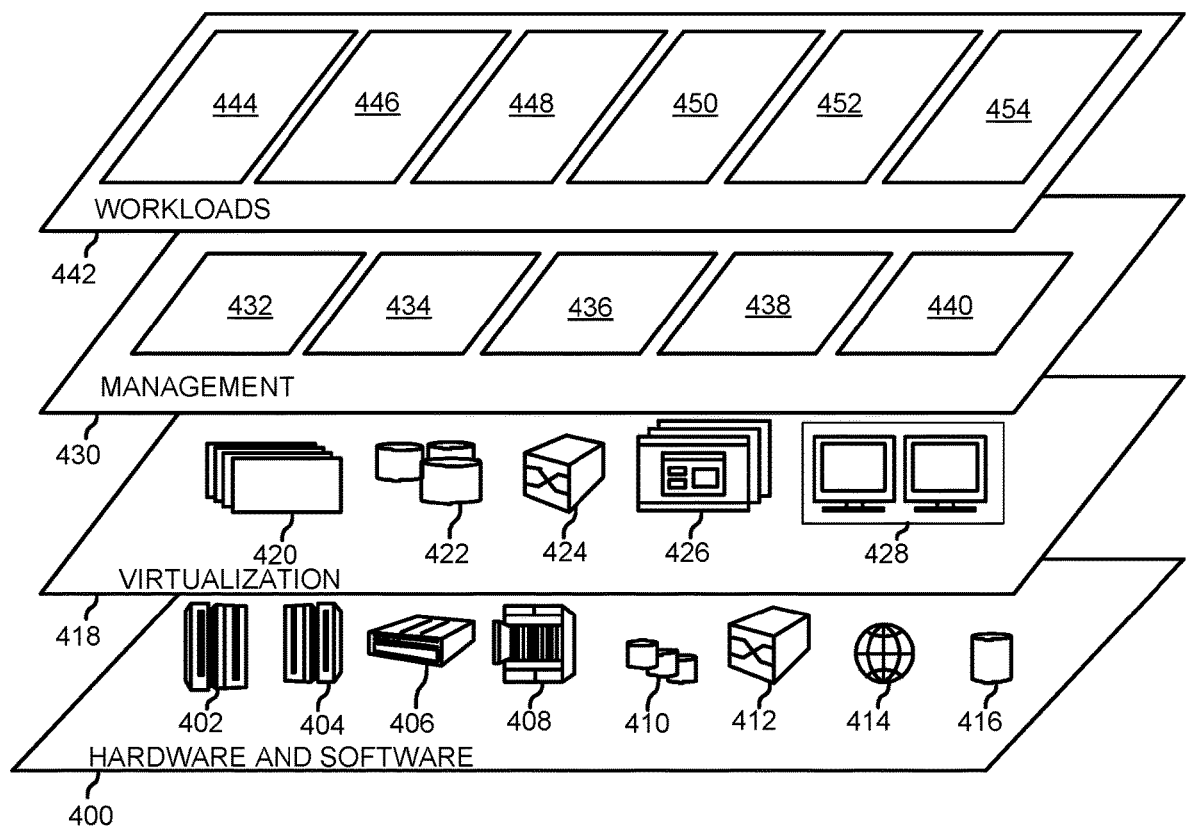
FIG. 4 illustrates a set of functional abstraction layers provided by the cloud computing environment, in accordance with an embodiment of the present invention.

Referring now to FIG. 4, a set of functional abstraction layers provided by cloud computing environment 300 (FIG. 3) is shown. It should be understood in advance that the components, layers, and functions shown in FIG. 4 are intended to be illustrative only and embodiments of the invention are not limited thereto. As depicted, the following layers and corresponding functions are provided:

Hardware and software layer 400 includes hardware and software components. Examples of hardware components include: one or more computers such as mainframes 402, RISC (Reduced Instruction Set Computer) architecture based servers 404, servers 406, and blade servers 408; storage devices 410; and networks and networking components 412. In some embodiments, software components include network application server software 414 and database software 416.

Virtualization layer 418 provides an abstraction layer from which the following examples of virtual entities may be provided: virtual servers 420; virtual storage 422; virtual networks 424, including virtual private networks; virtual applications and operating systems 426; and virtual clients 428.

In one example, management layer 430 may provide the functions described above. Resource provisioning 432 provides dynamic procurement of computing resources and other resources that are utilized to perform tasks within the cloud computing environment 300. Metering and pricing 434 provide cost tracking as resources are utilized within the cloud computing environment 300, and billing or invoicing for consumption of these resources. In one example, these resources may include application software licenses. Security provides identity verification for cloud consumers and tasks, as well as protection for data and other resources. User portal 436 provides access to the cloud computing environment 300 for consumers and system administrators. Service level management 438, which includes containers, provides cloud computing resource allocation and management such that required service levels are met. Service Level Agreement (SLA) planning and fulfillment 440 provide pre-arrangement for, and procurement of, cloud computing resources for which a future requirement is anticipated in accordance with an SLA.

Workloads layer 442 provides examples of functionality for which the cloud computing environment 300 may be utilized. Examples of workloads, tasks and functions which may be provided from this layer include: mapping and navigation 444; software development and lifecycle management 446; virtual classroom education delivery 448; data analytics processing 450; transaction processing 452; etc. More specifically, this layer includes the workloads, tasks and functions of the data replication environment 454 described above.

Computer Program Product

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart illustrations and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart illustrations and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart illustrations and/or block diagram block or blocks.

The flowchart illustrations and block diagrams in the Figures illustrate the architecture, functionality, and operation of possible implementations of systems, methods, and computer program products according to various embodiments of the present invention. In this regard, each block in the flowchart illustrations or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

CONCLUSION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
performing a dynamic rollover of source and target latency in a replication environment, by:
during a replication process in the replication environment, determining whether one or more tables are parked to indicate that the one or more tables are not to be replicated from a source data store to a target data store;
in response to determining the parked one or more tables, identifying open transactions where the parked one or more tables affect the source and target latency, wherein identifying the open transactions comprises identifying the open transactions on the source data store that comprise the parked one or more tables;
ignoring the identified open transactions that comprise the parked one or more tables during the replication process, wherein ignoring the open transactions further comprises:
using an access control list to only consider the open transactions initiated by a user determined to have a minimum privilege to perform an insert, update and delete operation, wherein the access control list comprises a list of privileges and permissions attached to a respective table and associated with one or more users; and
responsive to ignoring an open transaction among the identified open transactions due to the open transaction comprising the one or more parked tables, updating the source and target latency for each connection that included the one or more parked tables, wherein a source latency value for the connection shows the difference in time between when an entry in a record was written to a transaction log and the time when a source replication agent for the source data store read the record from the transaction log, and wherein a target latency value shows the difference in time between when the entry in the record was written to the transaction log and the time at which a target replication agent for the target data store applied that operation to the target database management system.

2. The method of claim 1, wherein the open transactions are in-progress and not completed.

3. The method of claim 1, further comprising skipping or ignoring the identified open transactions.

4. The method of claim 1, wherein identifying the open transactions comprises identifying the open transactions where the parked one or more tables are in-scope tables and the identified open transactions were initiated by one or more users with a determined minimum privilege to perform at least one of an insert, update or delete operation against the parked one or more tables.

5. The method of claim 1, wherein any subsequent changes for the parked one or more tables are not replicated to the target data store.

6. A computer-implemented system, comprising:
one or more computers programmed for performing a dynamic rollover of source and target latency in a replication environment, by:
during a replication process in the replication environment, determining whether one or more tables are parked to indicate that the one or more tables are not to be replicated from a source data store to a target data store;
in response to determining the parked one or more tables, identifying open transactions where the parked one or more tables affect the source and target latency, wherein identifying the open transactions comprises identifying the open transactions on the source data store that comprise the parked one or more tables and ignoring the open transactions that comprise the parked one or more tables;
ignoring the identified open transactions that comprise the parked one or more tables during the replication process, wherein ignoring the open transactions further comprises:
using an access control list to only consider the open transactions initiated by a user determined to have a minimum privilege to perform an insert, update and delete operation, wherein the access control list comprises a list of privileges and permissions attached to a respective table and associated with one or more users; and
responsive to ignoring an open transaction among the identified open transactions due to the open transaction comprising the one or more parked tables, updating the source and target latency for each connection that included the one or more parked tables, wherein a source latency value for the connection shows the difference in time between when an entry in a record was written to a transaction log and the time when a source replication agent for the source data store read the record from the transaction log, and wherein a target latency value shows the difference in time between when the entry in the record was written to the transaction log and the time at which a target replication agent for the target data store applied that operation to the target database management system.

7. The system of claim 6, wherein the open transactions are in-progress and not completed.

8. The system of claim 6, further comprising skipping or ignoring the identified open transactions.

9. The system of claim 6, wherein identifying the open transactions comprises identifying the open transactions where the parked one or more tables are in-scope tables and the identified open transactions were initiated by one or more users with a determined minimum privilege to perform at least one of an insert, update or delete operation against the parked one or more tables.

10. The system of claim 6, wherein any subsequent changes for the parked one or more tables are not replicated to the target data store.

11. A computer program product, the computer program product comprising a computer readable storage medium having program instructions embodied therewith, the program instructions executable by one or more computers to cause the computers to perform a method, comprising:

performing a dynamic rollover of source and target latency in a replication environment, by:

during a replication process in the replication environment, determining whether one or more tables are parked to indicate that the one or more tables are not to be replicated from a source data store to a target data store;

in response to determining the parked one or more tables, identifying open transactions where the parked one or more tables affect the source and target latency, wherein identifying the open transactions comprises identifying the open transactions on the source data store that comprise the parked one or more tables;

ignoring the identified open transactions that comprise the parked one or more tables during the replication process, wherein ignoring the open transactions further comprises:

using an access control list to only consider the open transactions initiated by a user determined to have a minimum privilege to perform an insert, update and delete operation, wherein the access control list comprises a list of privileges and permissions attached to a respective table and associated with one or more users; and responsive to ignoring an open transaction among the identified open transactions due to the open transaction comprising the one or more parked tables, updating the source and target latency for each connection that included the one or more parked tables, wherein a source latency value for the connection shows the difference in time between when an entry in a record was written to a transaction log and the time when a source replication agent for the source data store read the record from the transaction log, and wherein a target latency value shows the difference in time between when the entry in the record was written to the transaction log and the time at which a target replication agent for the target data store applied that operation to the target database management system.

12. The computer program product of claim 11, wherein identifying the open transactions comprises identifying the open transactions where the parked one or more tables are in-scope tables and the identified open transactions were initiated by one or more users with a determined minimum privilege to perform at least one of an insert, update or delete operation against the parked one or more tables.

\* \* \* \* \*